(12) United States Patent
Goncharov

(10) Patent No.: US 11,651,783 B1
(45) Date of Patent: May 16, 2023

(54) TWO LAYER LEADING SHIELD DESIGN WITH NON-CONFORMAL SHAPES FOR MAGNETIC RECORDING HEADS

(71) Applicant: Western Digital Technologies, Inc., San Jose, CA (US)

(72) Inventor: Alexander Goncharov, Morgan Hill, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/652,067

(22) Filed: Feb. 22, 2022

(51) Int. Cl.
 G11B 5/39 (2006.01)
 G11B 5/187 (2006.01)
 G11B 5/127 (2006.01)
 G11B 5/11 (2006.01)
 G11B 5/60 (2006.01)
 G11B 5/31 (2006.01)

(52) U.S. Cl.
 CPC .......... G11B 5/3912 (2013.01); G11B 5/1278 (2013.01); G11B 5/187 (2013.01); G11B 5/3116 (2013.01); G11B 5/6082 (2013.01); G11B 5/11 (2013.01); G11B 5/31 (2013.01)

(58) Field of Classification Search
 CPC ..... G11B 5/1278; G11B 5/187; G11B 5/3116; G11B 5/11; G11B 5/31; G11B 5/3912; G11B 5/6082
 See application file for complete search history.

(56) References Cited

U.S. PATENT DOCUMENTS

| | | | |
|---|---|---|---|
| 8,238,059 B1 | 8/2012 | Tang et al. | |
| 8,243,386 B2 | 8/2012 | Kameda et al. | |
| 8,524,095 B2 * | 9/2013 | Hong | G11B 5/3116 216/22 |
| 8,542,461 B2 | 9/2013 | Bai et al. | |
| 8,649,124 B2 * | 2/2014 | Zou | G11B 5/315 360/125.17 |
| 8,730,617 B1 * | 5/2014 | Hsiao | G11B 5/1278 360/125.3 |
| 8,767,347 B1 * | 7/2014 | Sasaki | G11B 5/315 360/123.06 |

(Continued)

FOREIGN PATENT DOCUMENTS

JP 2012113804 A 6/2012

OTHER PUBLICATIONS

Pan et al. Strong long-range perpendicular exchange bias across a spacer layer, AIP Advances, vol. 9, No. 125046, 2019, 5 pages, https://doi.org/10.1063/1.5128308.

Primary Examiner — Brian E Miller
(74) Attorney, Agent, or Firm — Patterson + Sheridan, LLP; Steven H. VerSteeg

(57) ABSTRACT

The present disclosure relates to a magnetic recording head having dual layer leading shield or leading edge shield (LES). The layer closest to the main pole of the magnetic recording head has a shallow flare to enhance shape anisotropy while the layer farthest away from the main pole has a steep flare to initiate reversal of the direction of magnetization for the layer during the initialization. The layer closest to the main pole will retain a direction of magnetization that matches the direction of magnetization of the initialization direction. Both layers are sufficiently thick to ensure a two domain state that is favorable from an energy balance point of view.

19 Claims, 5 Drawing Sheets

(56) References Cited

U.S. PATENT DOCUMENTS

| | | | |
|---|---|---|---|
| 8,867,169 B2* | 10/2014 | Sasaki | G11B 5/1278 360/125.21 |
| 8,988,823 B1* | 3/2015 | Sasaki | G11B 5/11 360/125.3 |
| 9,082,433 B1 | 7/2015 | Tang et al. | |
| 9,489,969 B1* | 11/2016 | Ikegawa | G11B 5/23 |
| 10,014,021 B1 | 7/2018 | Liu et al. | |
| 10,366,714 B1 | 7/2019 | Olson et al. | |
| 10,468,054 B1 | 11/2019 | Shin et al. | |
| 10,490,210 B1 | 11/2019 | Liu et al. | |
| 10,586,558 B1* | 3/2020 | Sasaki | G11B 5/3163 |
| 10,679,650 B2 | 6/2020 | Bai et al. | |
| 10,699,731 B1* | 6/2020 | Wu | G11B 5/1278 |
| 10,714,136 B1* | 7/2020 | Chen | G11B 5/3133 |
| 10,916,261 B1* | 2/2021 | Liu | G11B 5/315 |
| 10,997,989 B1* | 5/2021 | Asif Bashir | G11B 5/3153 |
| 11,087,783 B1* | 8/2021 | Song | G11B 5/3116 |
| 11,264,051 B1* | 3/2022 | Liu | G11B 5/02 |
| 2005/0068678 A1* | 3/2005 | Hsu | G11B 5/315 |
| 2008/0112081 A1 | 5/2008 | Matono | |
| 2009/0147410 A1* | 6/2009 | Jiang | G11B 5/1278 360/319 |
| 2012/0026629 A1* | 2/2012 | Hirata | G11B 5/3116 427/127 |
| 2012/0127612 A1 | 5/2012 | Shin et al. | |
| 2012/0236431 A1 | 9/2012 | Hirata et al. | |
| 2013/0242431 A1* | 9/2013 | Hosomi | G11B 5/235 216/22 |
| 2014/0098441 A1* | 4/2014 | Saito | G11B 5/3116 360/119.02 |
| 2015/0085395 A1* | 3/2015 | Yoshida | G11B 5/3932 29/603.07 |
| 2015/0162024 A1* | 6/2015 | Kudo | G11B 5/3116 360/75 |
| 2015/0194169 A1* | 7/2015 | Yamaguchi | G11B 5/315 360/235.4 |
| 2016/0171992 A1* | 6/2016 | Zhang | G11B 5/10 360/235.4 |
| 2020/0176021 A1 | 6/2020 | Liu et al. | |
| 2020/0402532 A1* | 12/2020 | Asif Bashir | G11B 5/314 |
| 2022/0375495 A1* | 11/2022 | Lam | G11B 5/315 |

\* cited by examiner

TWO LAYER LEADING SHIELD DESIGN WITH NON-CONFORMAL SHAPES FOR MAGNETIC RECORDING HEADS

BACKGROUND OF THE DISCLOSURE

Field of the Disclosure

Aspects of the present disclosure generally relate to a magnetic recording head having an exchange biased leading shield.

Description of the Related Art

Over the past few years, various magnetic recording methods have been studied to improve the areal density of a magnetic media device, such as a hard disk drive (HDD). Magnetic recording heads, or, in particular, the write heads, in HDDs can have a significant effect on the overall performance and reliability of the recording device. Magnetic recording heads may be designed to achieve specific advantages, such as improved performance, but may consequently have a negative impact on other characteristics, such as decreased reliability.

For example, some magnetic recording head designs use various shields around a main pole, such as side shields, leading shields, and trailing shields, to make the magnetic recording head sufficiently strong to write data to magnetic media, without disturbing the data that have already been previously written. The more recent energy assisted writers enable passing current between the main pole and the trailing shield, as well as the side-shield and leading shield assembly, to further enhance the writing ability. However, in energy assisted designs, magnetization stability is often compromised due to the modifications needed to accommodate the energy-assistance scheme, such as the insertion of a separation-gap between the trailing-shield/upper-return-pole assembly and side-shield/leading-shield assembly.

Therefore, there is a need in the art for a magnetic recording head having improved shields and enhanced control of magnetic fields.

SUMMARY OF THE DISCLOSURE

The present disclosure relates to a magnetic recording head having dual layer leading shield or leading edge shield (LES). The layer closest to the main pole of the magnetic recording head has a shallow flare to enhance shape anisotropy while the layer farthest away from the main pole has a steep flare to initiate reversal of the direction of magnetization for the layer during the initialization. The layer closest to the main pole will retain a direction of magnetization that matches the direction of magnetization of the initialization direction. Both layers are sufficiently thick to ensure a two domain state that is favorable from an energy balance point of view.

In one embodiment, a magnetic recording head comprises: a leading shield comprising a lower layer having a first throat height and an upper layer having a second throat height, wherein the upper layer is disposed on the lower layer, and wherein the second throat height is less than the first throat height; a trailing shield; and a main pole disposed between the leading shield and the trailing shield.

In another embodiment, a magnetic recording head comprises: a leading shield comprising a lower layer having a first flared portion having first flare angle relative to a direction perpendicular to a media facing surface and an upper layer having a second flared portion having a second flare angle relative to the direction perpendicular to the media facing surface, wherein the upper layer is disposed on the lower layer, and wherein the first flare angle is less than the second flare angle; a trailing shield; and a main pole disposed between the leading shield and the trailing shield.

In another embodiment, a magnetic recording head comprises: a leading shield comprising a lower layer having a first flared portion extending from a media facing surface and an upper layer having a second flared portion extending from the media facing surface, wherein the upper layer is disposed on the lower layer, wherein the first flared portion has a first length, wherein the second flared portion has a second length, and wherein the first length is less than the second length; a trailing shield; and a main pole disposed between the leading shield and the trailing shield.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure relates to a magnetic recording head having dual layer leading shield or leading edge shield (LES). The layer closest to the main pole of the magnetic recording head has a shallow flare to enhance shape anisotropy while the layer farthest away from the main pole has a steep flare to initiate reversal of the direction of magnetization for the layer during the initialization. The layer closest to the main pole will retain a direction of magnetization that matches the direction of magnetization of the initialization direction. Both layers are sufficiently thick to ensure a two domain state that is favorable from an energy balance point of view.

It is to be understood that the embodiments discussed herein are applicable to a data storage device such as a hard disk drive (HDD) as well as a tape drive such as a tape embedded drive (TED) or an insertable tape media drive such as those made according to Linear Tape Open (LTO) standards. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

Figure 1:
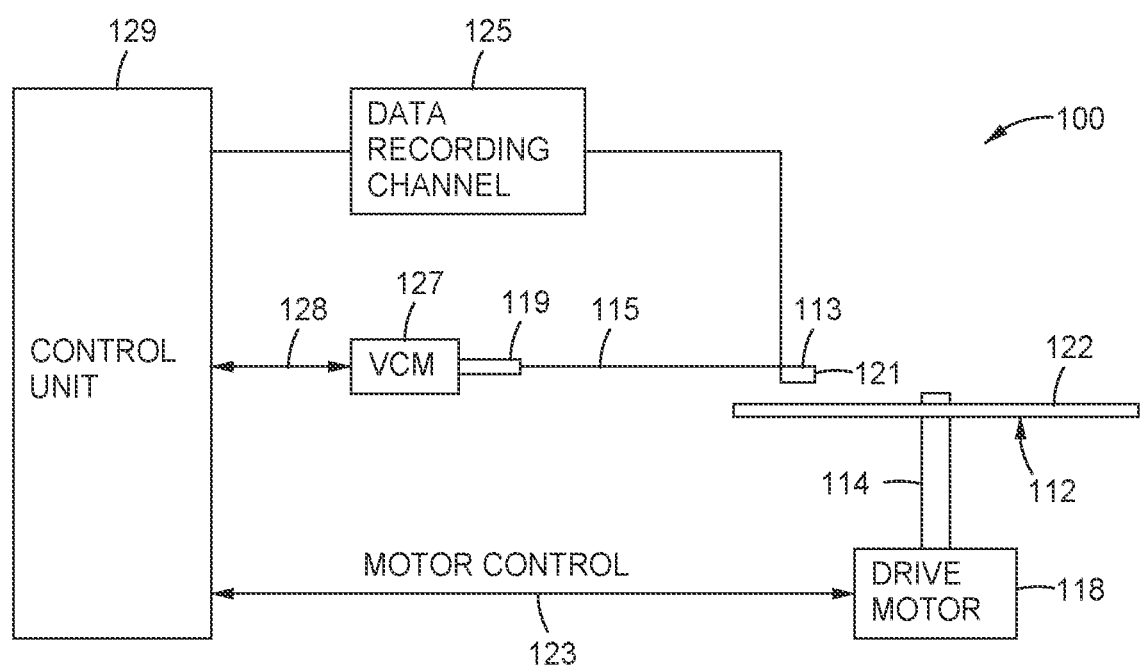
FIG. 1 illustrates a schematic view of a disk drive, according to one implementation.

FIG. 1 illustrates a schematic view of a disk drive (e.g., magnetic recording device) 100, according to one implementation. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field. The direction and speed of the coil movements are controlled by the motor current signals supplied by a control unit 129.

During operation of the magnetic recording device 100, the rotation of the magnetic media 112 generates an air bearing between the slider 113 and the media surface 122, which exerts an upward force or lift on the slider 113. The air bearing thus counter-balances the slight spring force of suspension 115 and supports the slider 113 off and slightly above the media 112 surface by a small, substantially constant spacing during normal operation. In an energy-assisted magnetic recording (EAMR) head, DC or AC electric-current flows through an assist element of the magnetic head assembly 121 and enhances the write-ability so that the write element of the magnetic head assembly 121 magnetizes the data bits in the media 112. In certain embodiments, the EAMR recording head may achieve the assistive effect via microwave assisted magnetic recording (MAMR) with a write assist element comprising a spin torque oscillator.

The various components of the magnetic recording device 100 are controlled in operation by control signals generated by control unit 129, such as access control signals and internal clock signals. Typically, the control unit 129 comprises logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
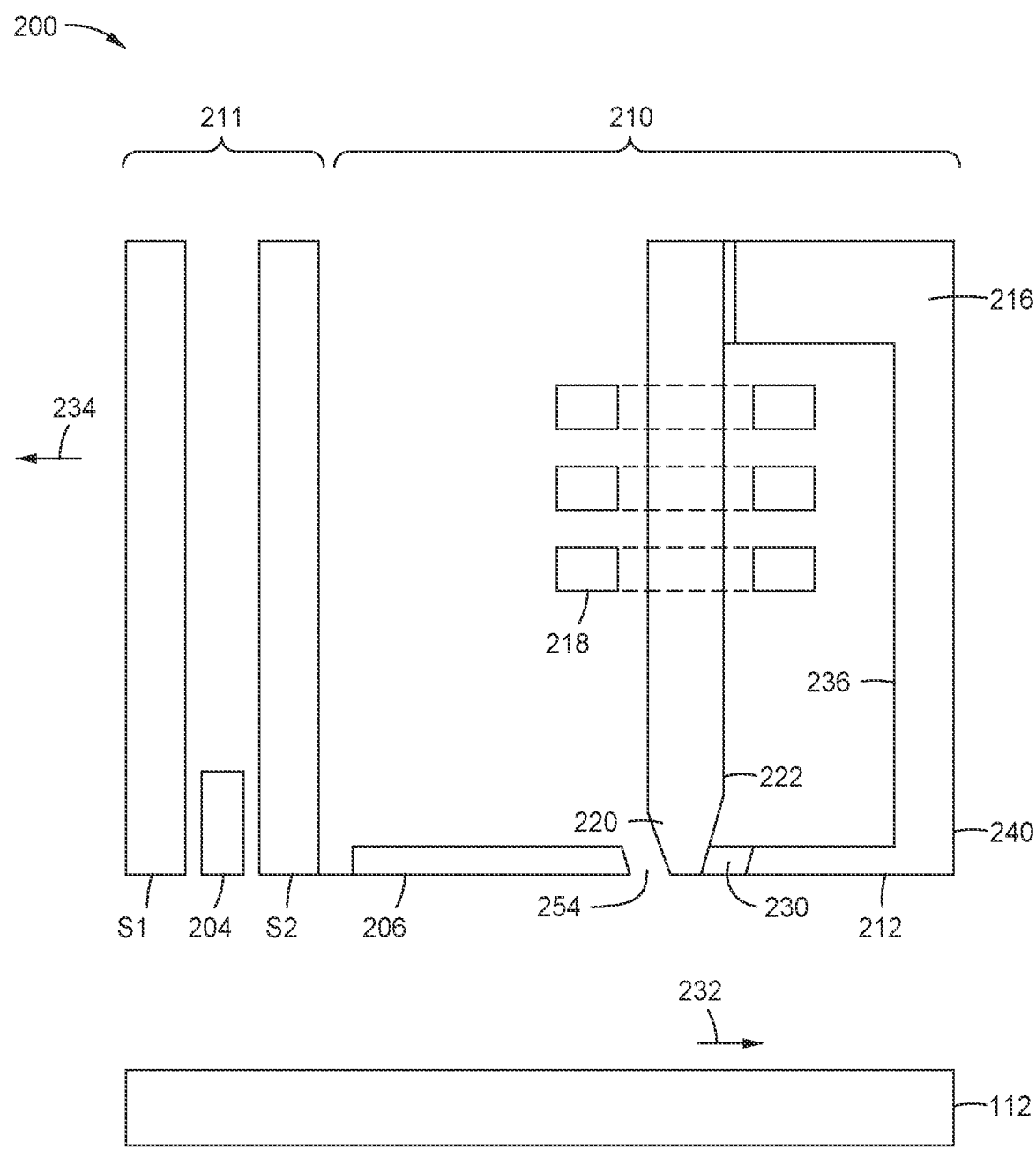
FIG. 2 is a fragmented and schematic cross-sectional side view through a center of a read/write head facing the magnetic media, according to one implementation.

FIG. 2 is a fragmented, cross sectional side view through the center of a read/write head 200 facing the magnetic media 112, according to one embodiment. The read/write head 200 may correspond to the magnetic head assembly 121 described in FIG. 1. The read/write head 200 includes a media facing surface (MFS) 212, such as an air bearing surface (ABS), a magnetic write head 210, and a magnetic read head 211, and is mounted such that the MFS 212 is facing the magnetic media 112. In FIG. 2, the magnetic media 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a main pole 220, an upper-return pole coupled to a trailing shield 240, and a coil 218 that excites the main pole 220. The write head 210 also comprises a leading shield 206. The coil 218 may have a "pancake" structure which winds around a back-contact between the main pole 220 and the return pole 216, instead of a "helical" structure shown in FIG. 2. A recording magnetic field is generated from the main pole 220 and the trailing shield 240 helps making the magnetic field gradient of the main pole 220 steep. The main pole 220 may be a magnetic material such as a FeCo alloy. The main pole 220 may include a trailing surface 222, which may be parallel to a leading surface 236 of the trailing shield 240. The main pole 220 may be a tapered write pole (TWP) with a trailing edge taper (TET) configuration. The main pole 220 may comprise ferromagnetic materials, typically alloys of one or more of Co, Fe, and Ni. The read/write head 200 may be an EAMR head that comprises a write assist element 230. The write assist element 230 is disposed between the main pole and at least one of: the trailing shield, the leading shield, the first side shield, and the second side shield. In one embodiment, a write assist element 230 is disposed between the trailing shield 240 and the main pole 220, as shown in FIG.

2, and/or between the leading shield 206 and the main pole 220 (gap 254). During writing, a DC or AC electric-current flows through the assist element to enhance writing performance.

In one embodiment, the write assist element 230 may include a spin torque oscillator (STO). In other embodiments, the write assist element 230 may include a multilayer structure including magnetic and non-magnetic materials, or a structure including non-magnetic electrically conductive material, each configured to provide assistive effect for the write operation. Examples of such a structure include those described in U.S. Pat. No. 10,366,714, titled "Magnetic write head for providing spin-torque-assisted write field enhancement," to Olson et al. and in U.S. Pat. No. 10,679,650, titled "Current-assisted magnetic recording write head with improved write gap structure" to Bai et al., both of which are assigned to assignee of the current application and hereby incorporated by reference.

Figure 3:
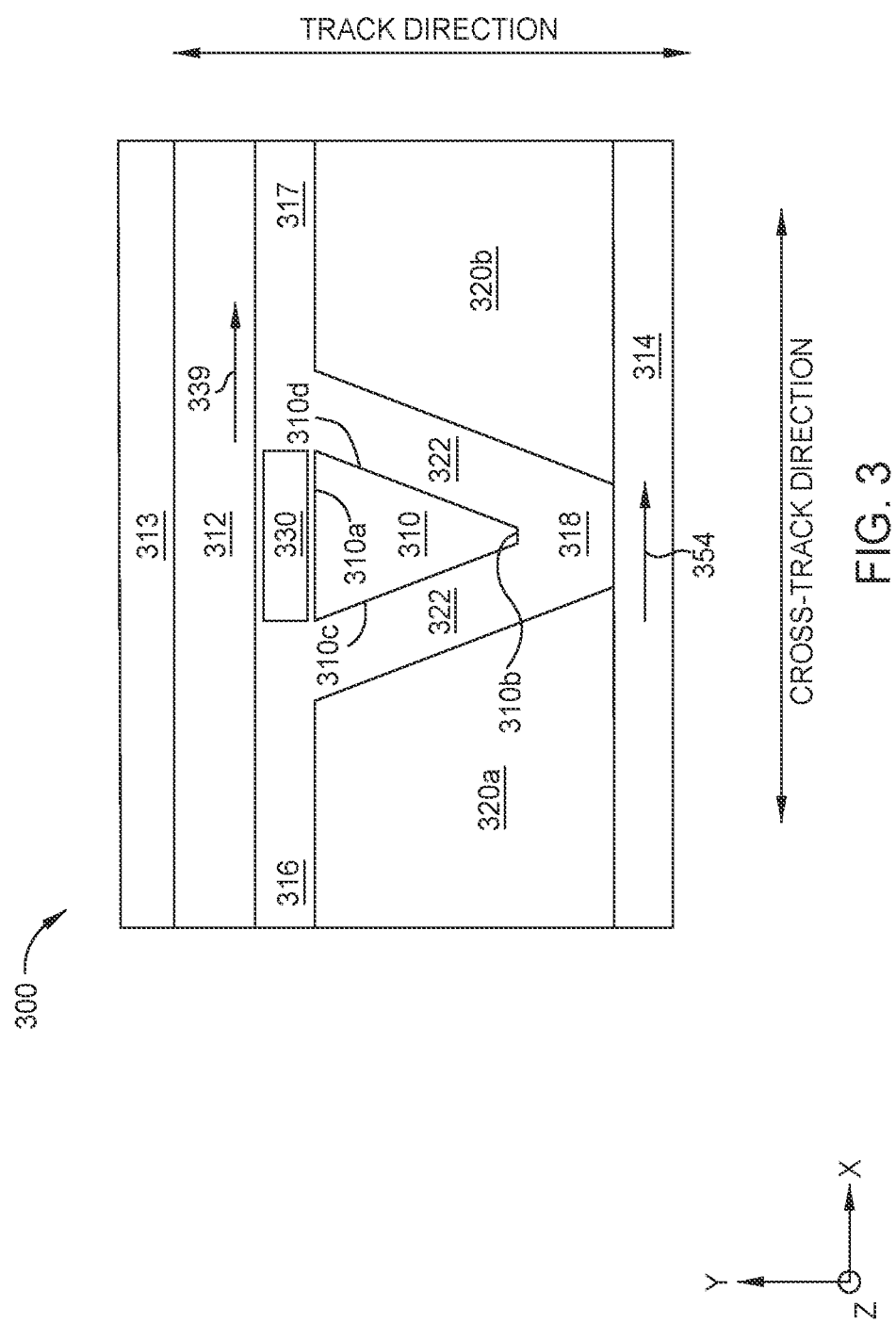
FIG. 3 is a schematic illustration of a media facing surface (MFS) view of a magnetic recording head according to one embodiment.

FIG. 3 illustrates a MFS view of a magnetic recording head 300 according to one embodiment. The magnetic recording head 300 may be the write head 210 of FIG. 2. The magnetic recording head 300 is within a magnetic recording device, such as the magnetic recording device 100 of FIG. 1. The magnetic recording head 300 is an energy assisted perpendicular magnetic recording (E-PMR) head.

The magnetic recording head 300 comprises a main pole 310 disposed between a trailing shield 312 and a LES 314 in the track direction. The main pole 310 may comprise a magnetic material such as an alloy of one or more of Co, Fe, Ni (e.g., FeCo, NiFe, or CoFeNi). The trailing shield 312 comprises a magnetic material such as a NiFe alloy. The trailing shield 312 is disposed opposite to a first surface 310a of the main pole 310, and the LES 314 is disposed adjacent to a second surface 310b of the main pole 310. The first surface 310a is opposite the second surface 310b. The main pole 310 is further disposed between side shields 320a, 320b in the cross-track direction. The side shields 320a, 320b comprise a material selected from the group consisting of NiFe, NiFeCo, and NiFeRe. The side shields 320a, 320b are disposed adjacent to a third surface 310c and a fourth surface 310d of the main pole 310, where the third surface 310c is opposite the fourth surface 310d. A trailing gap 316 is disposed between the first surface 310a of the main pole 310 and the trailing shield 312, and a leading gap 318 is disposed between the second surface 310b of the main pole 310 and the LES 314. Side gaps 322 are disposed between the third and fourth surfaces 310c, 310d of the main pole 310 and the side shields 320a, 320b. The trailing shield 312 is disposed between the trailing gap 316 and an upper return pole 313 and has a direction of magnetization 339. The return pole 313 may comprise a magnetic material such as an alloy of one or more of Co, Fe, Ni (e.g., FeCo, NiFe, or CoFeNi). In some embodiments, a current source (not shown) supplies alternating current (AC) or direct current (DC) to the magnetic recording head 300.

As will be discussed below, the LES 314 comprises a multilayer laminate structure having at least a pair of magnetic layers. Each of the magnetic layers is composed of the same material, or different magnetic materials. FIG. 3 further depicts an insulation layer 317 disposed between the side shields 320a, 320b and the trailing shield 312. The insulating layer 317 may comprise aluminum oxide. It has been discovered that the insulation layer 317 enables energy assisted design schemes that pass current through the write assist element 330, for example, as one located in a path between the main pole 310 and the trailing shield 312. In one embodiment, the write assist element 330 is an energy assisted recording head, or a part of a microwave assisted magnetic recording (MAMR) head. In some design schemes, the thickness of the insulation layer 317 is about 5 nm or less or about 50 nm or more, or about 5 nm to about 50 nm, such as about 10 nm to about 30 nm. Without being bound by theory, it is believed that the insulation layer 317 also causes magnetic instability by decoupling the trailing shield and upper return pole assembly from the side shield and leading shield assembly by breaking the magnetic "exchange coupling" between the assemblies and causing magnetic rotation.

EAMR heads can have a complicated structure of the wrap around shield in order to design an effective path of the electric current towards the main pole 310. One of the problems discovered in the recording head design with a disconnected side shield 320a, 320b and trailing shield 312 is a strong asymmetry of the write contour between positive and negative bits. The asymmetry is strongly correlated with the loss of overwrite in such recording heads leading to a significant loss in areal density capacity (ADC). The origin of the contour asymmetry is related to the shield design with disconnected side shield 320a, 320b and trailing shield 312. The flux return path from the main pole 310 to the upper return pole 313 is affected in such a way that the LES 314 plays a role in the flux closure. Both experimental and modeling confirm that the LES 314 with a two-domain state has high effective permeability and conducts flux symmetrically for both sides of the side shield 320a, 320b, effectively removing the contour asymmetry.

Figure 4:
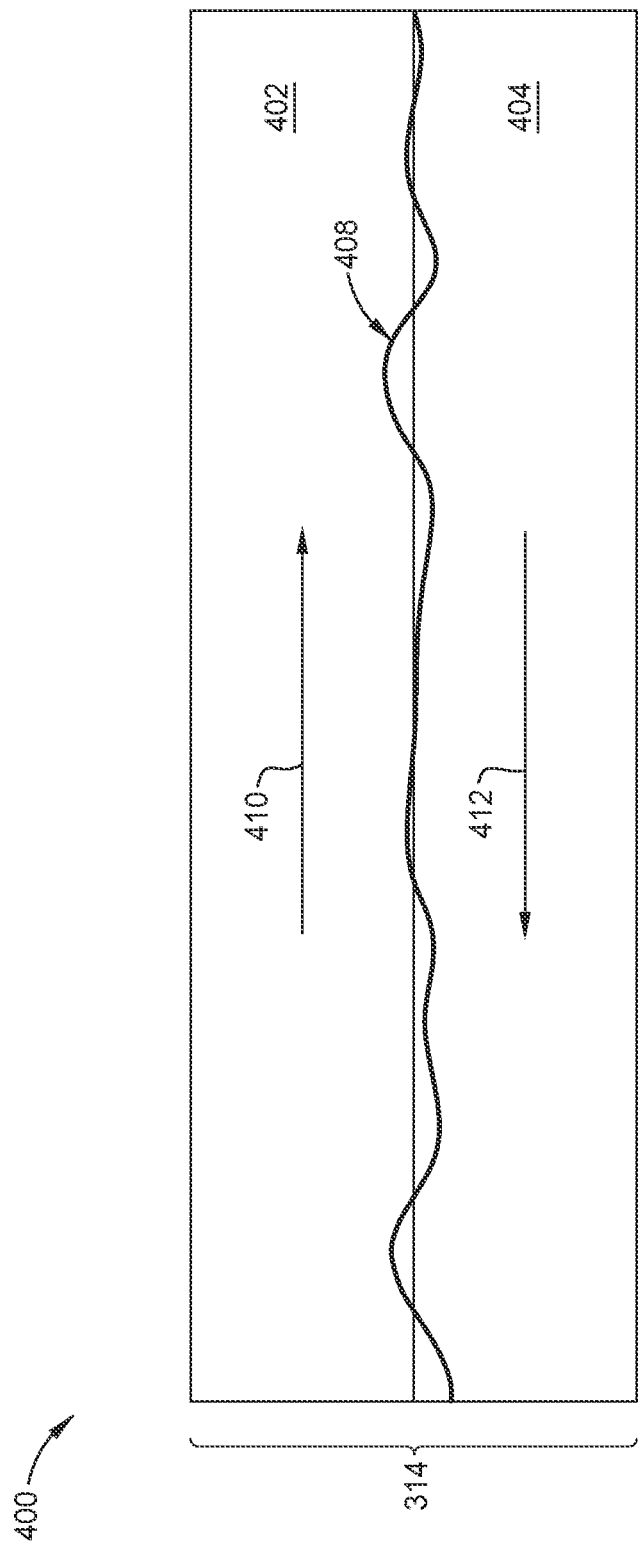
FIG. 4 is a schematic illustration of a leading edge shield (LES) structure according to one embodiment.

FIG. 4 is a schematic illustration of a LES structure 400 according to one embodiment. The structure 400 comprises the LES 314. The LES 314 comprises two layers, lower layer 404 and upper layer 402, that comprise soft magnetic material such as NiFe. The leading shield 314 has a throat height of between about 150 microns and about 350 microns that permits the leading shield 314 to conduct magnetic flux efficiently. A direction of magnetization 410 of the upper layer 402, which is adjacent to the main pole 310, is parallel to the direction of magnetization 339 in the trailing shield 312. A configuration where the upper layer 402 has a direction of magnetization 410 that is parallel to the direction of magnetization 339 of the trailing shield 312 has a good effective permeability. The magnetization 412 of the lower layer 404 points in the opposite direction of (i.e., antiparallel to) the direction of magnetization 410 for the upper layer 402. The two domains, or more specifically the magnetizations 410, 412 of the upper layer 402 and the lower layer 404, are separated by a domain wall 408.

A uniform (i.e., single layer) LES 314 causes asymmetric main pole 310 saturation and asymmetric magnetic core width (MCW). Even if a two layer LES 314 is used, a stiff upper layer 402 can still cause MCW asymmetry as well as main pole asymmetric saturation. Generally, the stiffer the upper layer 402, the more main pole asymmetric saturation occurs. For example, an upper layer 402 having a stress induced anisotropy exceeding 20 Oe in the cross-track direction can cause MCW asymmetry. MCW asymmetry with a stiff upper layer 402 in the two domain state is smaller than with a uniform LES 314. The lower layer 404, regardless of whether stiff or soft, does not impact MCW asymmetry if the upper layer 402 is kept soft.

Because a stiff upper layer 402 negatively impacts MCW asymmetry, a soft upper layer 402 is used in the two layer leading shield 314. The soft upper layer 402 will have a stress induced anisotropy in the cross-track direction of up to about 10 Oe. Because the stiffness of the lower layer 404 does not impact MCW asymmetry, the lower layer 404 can be either stiff or soft. The lower layer 404 may have a stress induced anisotropy in the cross-track direction of up to about 100 Oe, such as about 50 Oe. Above 100 Oe, it will be difficult to obtain exchange biasing for the leading shield 314. However, the Hk of the upper layer 402 Hk impacts the MCW such that a higher Hk for the upper layer 402 leads to a larger MCW. Hence, the lower the Hk of the upper layer 402 (i.e., the softer the upper layer 402), the lower the MCW. Additionally, because the upper layer 402 has a low Hk, is a soft magnetic material, and is adjacent the side shield 320a, 320b, MCW asymmetry can be significantly reduced. By exchange biasing the lower layer 404, any remaining MCW asymmetry is counteracted.

It is to be understood that stiffness and softness are mainly governed by the magneto-elastic anisotropy. Therefore, materials with high magnetostriction constants tend to be more magnetically stiff in the presence of mechanical stress. Examples of suitable alloys include NiFe alloys with different Fe content such as $Ni_{80}Fe_{20}$ and $Ni_{45}Fe_{55}$. Therefore, there is value in the two domain state over the uniform (i.e., single layer) LES 314.

It is to be understood that both the upper layer 402 and the lower layer 404 may comprise soft magnetic material such as NiFe. In one embodiment, the lower layer 404 and the upper layer 402 comprise the same soft magnetic material. It is contemplated that while the upper layer 402 and lower layer 404 may comprise the same soft magnetic material, the stoichiometric compositions of the layers 402, 404 may be different.

Figure 5B:
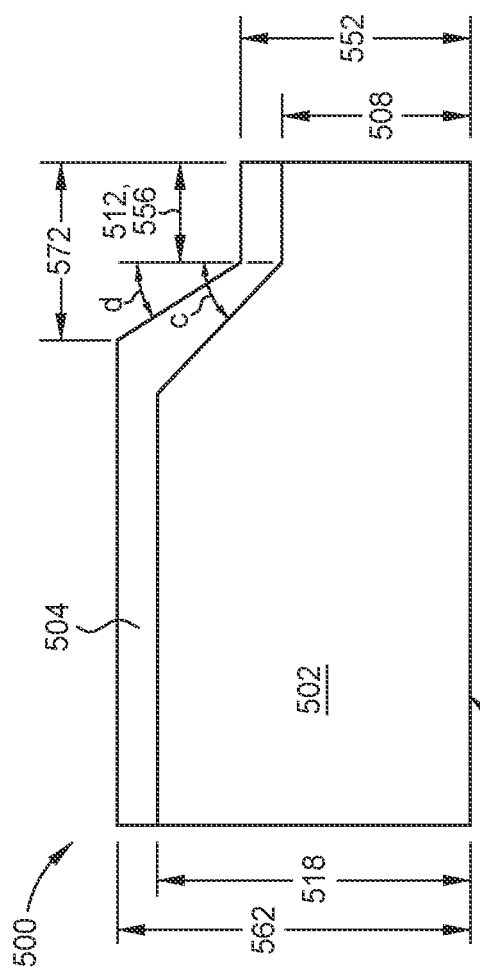
FIGS. 5A-5C are schematic illustrations of a LES according to one embodiment.
Figure 5C:
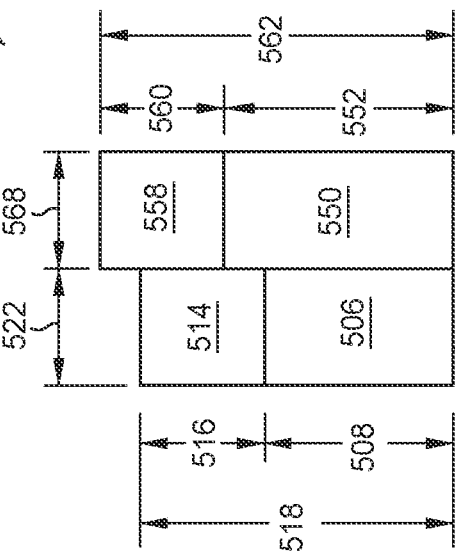
Figure 5A:
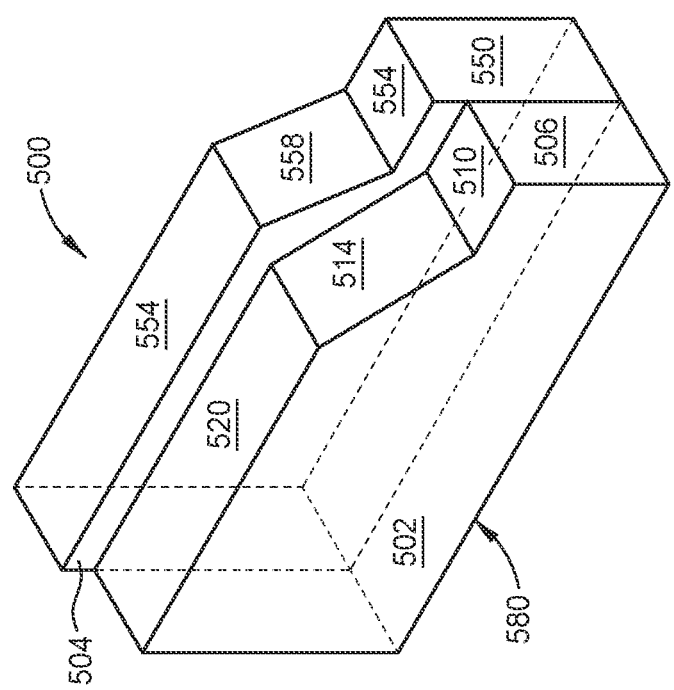

FIGS. 5A-5C are schematic illustrations of a LES 500 according to one embodiment. FIG. 5A is an isometric illustration of the LES 500. FIG. 5B is a side view of the LES 500, and FIG. 5C a cross-track view of the LES 500. In each of FIG. 5A-5C, the LES 500 is shown cut in half such that the other half is a mirror image along the plane represented by surface 580. The LES comprises an upper layer 502 and a lower layer 504. The upper layer 502 will be disposed adjacent the main pole and thus between the main pole and the lower layer 504. In some embodiments, the upper layer 502 corresponds to the upper layer 402 while the upper layer 504 corresponds to the upper layer 404, and thus the above discussion on material compositions of the layers apply here as well for those embodiments.

Taking a closer look at the upper layer 502, the upper layer 502 comprises a first surface 506, and a second surface 510 perpendicular thereto. The first surface 506 has a first length 508 which is referred to as a throat height. The first length 508 is between about 150 nm and about 500 nm such as about 450 nm. The second surface 510 has a second length 512 of between about 70 nm and about 250 nm. The upper layer 502 also comprises a third surface 514 that has a third length 516 of between about 70 nm and about 250 nm. The third surface 514 is disposed at a first angle "c", oftentimes referred to as the flare angle, relative to the direction perpendicular to the ABS of between about 40 degrees and about 90 degrees. Collectively, the first length 508 and the third length 516 create a first height 518 of between about 300 nm and about 1000 nm. The upper layer 502 also comprises a fourth surface 520 that is parallel to the ABS and parallel to the second surface 510. Each of the first surface 506, the second surface 510, the third surface 514, and the fourth surface 520 has a first width 522 of between about 400 nm and about 800 nm such as about 750 nm.

The lower layer 504 comprises a fifth surface 550, and a sixth surface 554 perpendicular thereto. The fifth surface 550 has a fifth length 552 which is referred to as the throat height. The fifth length 552 is between about 200 nm and about 600 nm such as about 550 nm. The sixth surface 554 has a sixth length 656 of between about 70 nm and about 250 nm. The lower layer 504 also comprises a seventh surface 558 that has a seventh length 560 of between about 70 nm and about 250 nm. The seventh surface 558 is disposed at the second angle "d", oftentimes referred to as the flare angle, relative to the direction perpendicular to the ABS of between about 30 degrees and about 45 degrees. Collectively, the fifth length 552 and the seventh length 560 create a second height 562 of between about 600 nm and about 1000 nm such as about 950 nm. The lower layer 504 also comprises an eighth surface 564 that is parallel to the ABS and parallel to the sixth surface 554. Each of the fifth surface 550, the sixth surface 554, the seventh surface 558, and the eighth surface 564 have a second width 568 of between about 650 nm and about 750 nm such as about 700 nm.

The second surface 510 and the third surface 514 collectively extend a first distance 570 of between about 150 nm and about 2000 nm in the cross-track direction. The sixth surface 554 and the seventh surface 558 collectively extend a first distance 572 of between about 150 nm to about 1000 nm in the cross-track direction.

The first length 508 is less than the fifth length 552, and a ratio of the first length 508 to the fifth length 552 is between about 1.01 to about 1.66 such as about 1.1. The second length 512 is equal to the sixth length 556. The third length 516 is equal to the seventh length 560. The first height 518 is less than the second height 562, and a ratio of the first height 518 to the second height 562 is between about 1.01 and about 1.2. The first angle "c" is greater than the second angle "d", and a ratio of the first angle "c" to the second angle "d" is between about 1.1 and about 2.

By utilizing different throat heights and/or flare angles and/or flare lengths for both the upper layer and the lower layer of the LES, contour asymmetry is effectively removed for the magnetic recording head, and a magnetic recording head having improved shields and enhanced control of magnetic fields is obtained. By utilizing non-conformal shapes for the multi-layer LES, contour asymmetry can be effectively removed. The lower layer in the multi-layer LES has a steep flare angle (relative to the upper layer in the multi-layer LES) to initiate reversal of the magnetization during initialization. The upper layer has a shallow flare (compared to the lower layer) to enhance the shape anisotropy. When the shields are initialized in the applied magnetic field, the layer with the shallow flare angle will retain the magnetization in the initialization direction. The thickness of each layer in the down track direction is larger than 500 nm in order to make a two domain state favorable from the energy balance point of view. The Hk value for all layers in the LES is 10 Oe. Due to the length of the surface of the LES at the ABS, the layer adjacent to the LES (not shown) has a thickness that is increased by about 85 nm in the down track direction. The layer is increased in order to make room for a thicker throat (e.g., first length 508). A thicker layer will reduce flux leakage from the main pole into the upper layer 502 of the LES 500.

In one embodiment, a magnetic recording head comprises: a leading shield comprising a lower layer having a first throat height and an upper layer having a second throat height, wherein the upper layer is disposed on the lower layer, and wherein the second throat height is less than the first throat height; a trailing shield; and a main pole disposed between the leading shield and the trailing shield. A ratio of the first throat height to the second throat height is between about 1.1 and about 1.66. The lower layer of the leading shield and the upper layer of the leading shield comprise NiFe. A direction of magnetization of the upper layer is parallel to a direction of magnetization of the trailing shield. A direction of magnetization of the lower layer is different than the direction of magnetization of the upper layer. A thickness of both the upper layer and the lower layer is greater than 400 nm. A magnetic anisotropy field for each of the upper layer and the lower layer is 10-20 Oe. The lower layer has a first thickness in a down track direction, wherein the upper layer has a second thickness in the down track direction, and wherein the first thickness is greater than or equal to the second thickness. The lower layer has a first flared surface extending from a first location recessed from a media facing surface having a first flare angle, wherein the upper layer has a second flared surface extending from a second location recessed from the media facing surface having a second flare angle, wherein the first angle is less than the second angle. The first flared surface has a first flare length, wherein the second flared surface has a second flare length, and wherein the second flare length is greater than the first flare length. A magnetic recording device comprising the magnetic recording head is also disclosed.

In another embodiment, a magnetic recording head comprises: a leading shield comprising a lower layer having a first flared portion having first flare angle relative to a direction perpendicular to a media facing surface and an upper layer having a second flared portion having a second flare angle relative to the direction perpendicular to the media facing surface, wherein the upper layer is disposed on the lower layer, and wherein the first flare angle is less than the second flare angle; a trailing shield; and a main pole disposed between the leading shield and the trailing shield. The first flared portion extends from a first location recessed a first distance from the media facing surface, wherein the second flared portion extends from a second location recessed a second distance from the media facing surface. The magnetic recording head further comprises an energy assisting element disposed between the main pole and the trailing shield. The first flare angle is between about 30 degrees and about 45 degrees. The second flare angle is between about 45 degrees and about 90 degrees. A magnetic recording device comprising the magnetic recording head is also disclosed.

In another embodiment, a magnetic recording head comprises: a leading shield comprising a lower layer having a first flared portion extending from a media facing surface and an upper layer having a second flared portion extending from the media facing surface, wherein the upper layer is disposed on the lower layer, wherein the first flared portion has a first length, wherein the second flared portion has a second length, and wherein the first length is less than the second length; a trailing shield; and a main pole disposed between the leading shield and the trailing shield. The first length is between about 150 nm and about 1000 nm, and wherein the second length is between about 150 nm and about 2000 nm. A magnetic recording device comprising the magnetic recording head is also disclosed.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
a leading shield comprising a lower layer having a first throat height and an upper layer having a second throat height, wherein the upper layer is disposed on the lower layer, and wherein the second throat height is less than the first throat height;
a trailing shield, wherein a direction of magnetization of the upper layer is parallel to a direction of magnetization of the trailing shield, and wherein a direction of magnetization of the lower layer is different than the direction of magnetization of the upper layer; and
a main pole disposed between the leading shield and the trailing shield.

2. The magnetic recording head of claim 1, wherein the lower layer of the leading shield and the upper layer of the leading shield comprise NiFe.

3. The magnetic recording head of claim 1, wherein a thickness of both the upper layer and the lower layer is greater than 500 nm.

4. The magnetic recording head of claim 1, wherein a magnetic anisotropy field for each of the upper layer and the lower layer is 10-20 Oe.

5. The magnetic recording head of claim 1, wherein the lower layer has a first thickness in a down track direction, wherein the upper layer has a second thickness in the down track direction, and wherein the first thickness is greater than or equal to the second thickness.

6. The magnetic recording head of claim 1, wherein the lower layer has a first flared surface extending from a first location recessed from a media facing surface having a first flare angle, wherein the upper layer has a second flared surface extending from a second location recessed from the media facing surface having a second flare angle, wherein the first angle is less than the second angle.

7. The magnetic recording head of claim 6, wherein the first flared surface has a first flare length, wherein the second flared surface has a second flare length, and wherein the second flare length is greater than the first flare length.

8. A magnetic recording device comprising the magnetic recording head of claim 1.

9. A magnetic recording head, comprising:
a leading shield comprising a lower layer having a first throat height and an upper layer having a second throat height, wherein the upper layer is disposed on the lower layer, wherein the second throat height is less than the first throat height, and wherein a ratio of the first throat height to the second throat height is between about 1.1 and about 1.66;
a trailing shield; and
a main pole disposed between the leading shield and the trailing shield.

10. A magnetic recording head, comprising:
a leading shield comprising a lower layer having a first flared portion having first flare angle relative to a direction perpendicular to a media facing surface (MFS) and an upper layer having a second flared portion having a second flare angle relative to the direction perpendicular to the MFS, wherein:
the upper layer is disposed on the lower layer,
the first flare angle is less than the second flare angle,
the first flared portion extends from a first location recessed a first distance from the media facing surface, and
the second flared portion extends from a second location recessed a second distance from the media facing surface;
a trailing shield; and
a main pole disposed between the leading shield and the trailing shield.

11. The magnetic recording head of claim 10, further comprising an energy assisting element disposed between the main pole and the trailing shield.

12. The magnetic recording head of claim 10, wherein the first flare angle is between about 30 degrees and about 45 degrees.

13. The magnetic recording head of claim 10, wherein the second flare angle is between about 45 degrees and about 90 degrees.

14. A magnetic recording device comprising the magnetic recording head of claim 10.

15. The magnetic recording head of claim 10, wherein a direction of magnetization of the upper layer is different than a direction of magnetization of the lower layer.

16. A magnetic recording head, comprising:
a leading shield comprising a lower layer having a first flared portion extending from a media facing surface and an upper layer having a second flared portion extending from the media facing surface, wherein the upper layer is disposed on the lower layer, wherein the first flared portion has a first length, wherein the second flared portion has a second length, and wherein the first length is less than the second length;
a trailing shield; and
a main pole disposed between the leading shield and the trailing shield.

17. The magnetic recording head of claim 16, wherein the first length is between about 150 nm and about 1000 nm, and wherein the second length is between about 150 nm and about 2000 nm.

18. A magnetic recording device comprising the magnetic recording head of claim 16.

19. The magnetic recording head of claim 16, wherein a direction of magnetization of the upper layer is parallel to a direction of magnetization of the trailing shield, and wherein a direction of magnetization of the lower layer is different than the direction of magnetization of the upper layer.

* * * * *